US012109861B2

(12) United States Patent
Tsukahara

(10) Patent No.: US 12,109,861 B2
(45) Date of Patent: Oct. 8, 2024

(54) CALIBRATION DEVICE, SUSPENSION SYSTEM, SADDLE-TYPE VEHICLE, AND CALIBRATION METHOD

(71) Applicant: Hitachi Astemo, Ltd., Hitachinaka (JP)

(72) Inventor: Hajime Tsukahara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 379 days.

(21) Appl. No.: 17/697,408

(22) Filed: Mar. 17, 2022

(65) Prior Publication Data

US 2022/0203794 A1 Jun. 30, 2022

Related U.S. Application Data

(63) Continuation of application No. PCT/JP2020/024523, filed on Jun. 23, 2020.

(51) Int. Cl.
*B60G 17/018* (2006.01)
*B60G 17/019* (2006.01)

(52) U.S. Cl.
CPC ......... *B60G 17/018* (2013.01); *B60G 17/019* (2013.01); *B60G 2300/12* (2013.01); *B60G 2400/25* (2013.01); *B60G 2400/90* (2013.01); *B60G 2401/25* (2013.01); *B60G 2600/082* (2013.01)

(58) Field of Classification Search
CPC B60G 17/018; B60G 17/019; B60G 2300/12; B60G 2400/25; B60G 2400/90; B60G 2401/25; B60G 2600/082
USPC .......................................................... 701/2
See application file for complete search history.

(56) References Cited

U.S. PATENT DOCUMENTS

| 5,105,918 A | * | 4/1992 | Hagiwara | ............... F16F 9/463 188/266.7 |
| 5,429,384 A | * | 7/1995 | Takahashi | ............... F16F 9/468 280/124.109 |
| 5,467,280 A | * | 11/1995 | Kimura | ................... B60G 17/08 280/5.515 |

(Continued)

FOREIGN PATENT DOCUMENTS

| GB | 2430750 A | * | 4/2007 | ............. G01B 7/003 |
| JP | 2016194320 A |  | 11/2016 |  |
| JP | 2020173169 A | * | 10/2020 | ............. G01B 7/003 |

OTHER PUBLICATIONS

International Search Report mailed Aug. 4, 2020 for the corresponding International Patent Application No. PCT/JP2020/024523, 5 pages [English translation attached].

*Primary Examiner* — Richard A Goldman
(74) *Attorney, Agent, or Firm* — Leason Ellis LLP; Edward J. Ellis; Melvin C. Garner

(57) ABSTRACT

A calibration device includes: a first coefficient calculation unit, a first output unit, an ideal value calculation unit, a second coefficient calculation unit configured to calculate a second coefficient by dividing a second output value by the ideal value, the second output value being an actual output value of the detector when the extension/contraction amount of the suspension device is the first extension/contraction amount, and a calibration unit configured to calculate a calibration value which is an output value after calibration of the detector when the suspension device has the minimum extension/contraction amount, by using the second output value, the first extension/contraction amount, the operation amount, the first output value, and the second coefficient.

13 Claims, 14 Drawing Sheets

(56) References Cited

U.S. PATENT DOCUMENTS

| | | | | |
|---|---|---|---|---|
| 6,305,673 | B1* | 10/2001 | Delorenzis | F16F 5/00 |
| | | | | 188/284 |
| 6,752,026 | B1* | 6/2004 | Hyde | G01F 1/586 |
| | | | | 73/861.15 |
| 9,909,902 | B2* | 3/2018 | Troost | G01D 5/2013 |
| 2002/0130649 | A1* | 9/2002 | Raith | H02M 1/126 |
| | | | | 323/355 |
| 2003/0075881 | A1* | 4/2003 | Delorenzis | B60G 17/0432 |
| | | | | 280/5.5 |
| 2003/0075882 | A1* | 4/2003 | Delorenzis | B60G 17/056 |
| | | | | 280/5.508 |
| 2007/0130942 | A1* | 6/2007 | Tao | F16D 48/04 |
| | | | | 60/547.1 |
| 2011/0058968 | A1* | 3/2011 | Kang | F04B 49/12 |
| | | | | 417/415 |
| 2012/0174771 | A1* | 7/2012 | De Maglie | F15B 15/2815 |
| | | | | 92/5 R |
| 2014/0218051 | A1* | 8/2014 | Braun | F15B 15/2853 |
| | | | | 324/654 |
| 2015/0114220 | A1* | 4/2015 | Dropmann | F16J 1/12 |
| | | | | 92/5 R |
| 2016/0059658 | A1* | 3/2016 | Kuriki | B60G 13/14 |
| | | | | 290/1 R |
| 2016/0288867 | A1* | 10/2016 | Murakami | B62J 45/42 |
| 2017/0097246 | A1* | 4/2017 | Leutenegger | F15B 15/2869 |
| 2018/0251123 | A1* | 9/2018 | Sigmar | B62D 17/00 |
| 2018/0326809 | A1* | 11/2018 | Masamura | B60G 17/015 |
| 2020/0277949 | A1* | 9/2020 | Kwak | F04B 53/14 |
| 2021/0354523 | A1* | 11/2021 | Hirao | B60G 17/06 |
| 2022/0203794 | A1* | 6/2022 | Tsukahara | B62D 7/15 |

* cited by examiner

FIG.1
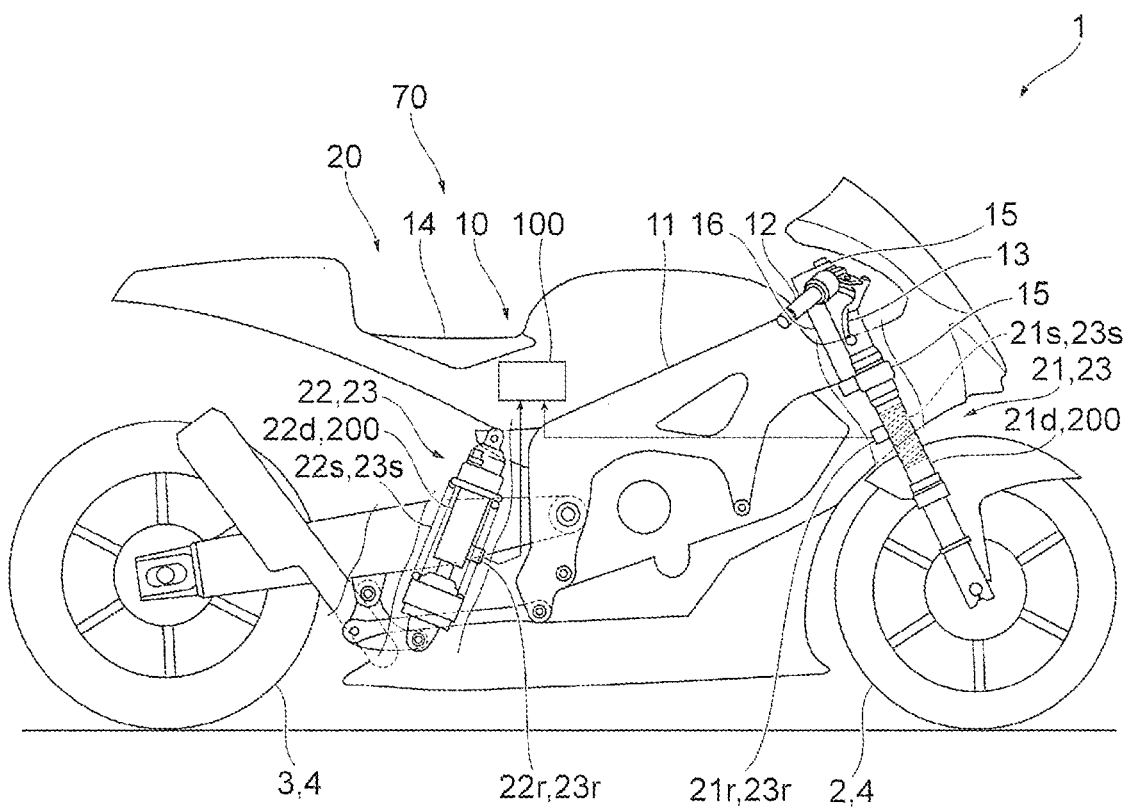
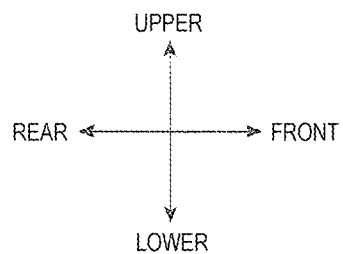

FIG.7

CONTENTS STORED IN STORAGE UNIT 120

| | |
|---|---|
| MINIMUM OUTPUT VALUE | Pm1(C0,L0), Pm1(C0,L1), Pm1(C0,L2), Pm1(C1,L0), Pm1(C1,L1), Pm1(C1,L2), Pm1(C2,L0), Pm1(C2,L1), Pm1(C2,L2) |
| SUBTRACTION VALUE | D1(C0,L0), D1(C0,L1), D1(C0,L2), D1(C1,L0), D1(C1,L1), D1(C1,L2), D1(C2,L0), D1(C2,L1), D1(C2,L2) |
| OUTPUT VALUE COEFFICIENT | A1 |
| SHORTEST OUTPUT VALUE | P1 |
| OUTPUT VALUE | P0 |
| STROKE AMOUNT | X1 |
| STROKE-POSSIBLE AMOUNT | X0 |
| IDEAL OUTPUT VALUE | P2 |
| OUTPUT VALUE | P3 |
| OUTPUT VALUE COEFFICIENT | A2 |
| CALIBRATION VALUE | P4 |
| RELATIONAL EXPRESSION | $F = Ln \times X + P4$ |

FIG.9
Pm1 MEASUREMENT
Px1 MEASUREMENT
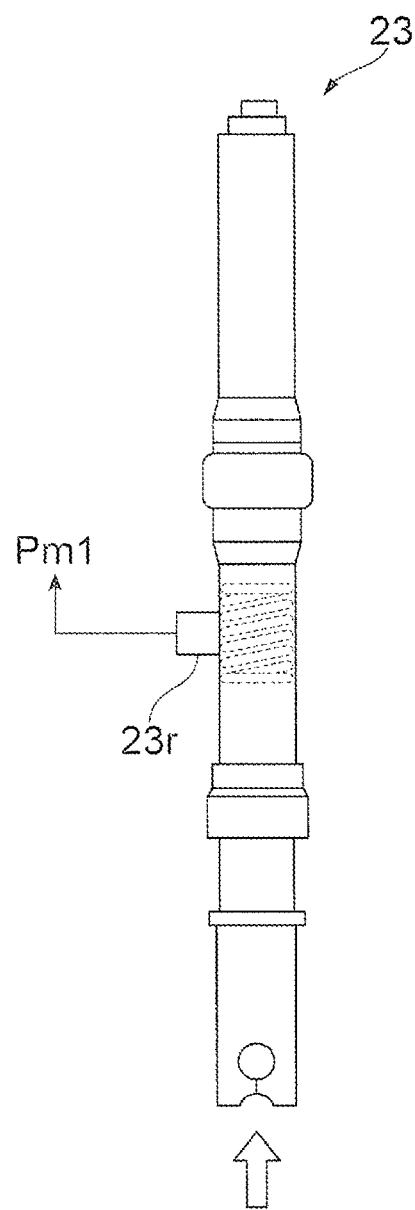
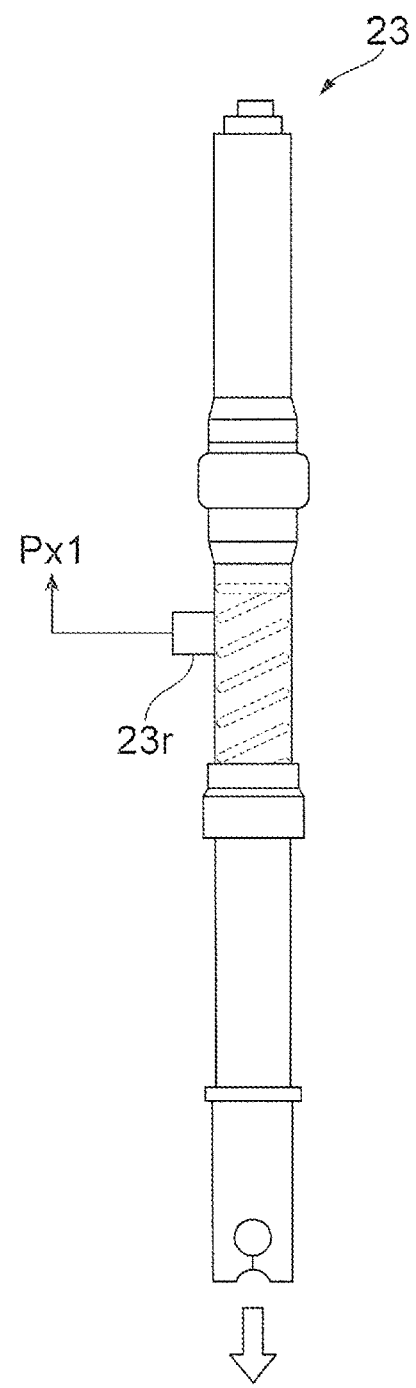

CALIBRATION DEVICE, SUSPENSION SYSTEM, SADDLE-TYPE VEHICLE, AND CALIBRATION METHOD

CROSS-REFERENCE TO RELATED APPLICATION(S)

This application is a Continuation of International Application No. PCT/JP2020/024523 filed on Jun. 23, 2020, the contents of which is incorporated herein by reference in its entirety.

FIELD OF THE INVENTION

The present invention relates to a calibration device, a suspension system, a saddle-type vehicle, and a calibration method.

BACKGROUND OF THE INVENTION

In related-art, there has been proposed a device which calculates an extension/contraction amount of a suspension device by using an output value from a sensor which detects the extension/contraction amount of the suspension device.

For example, a front fork disclosed in JP-A-2016-194320 includes an outer tube provided on an upper end side, an inner tube provided on a lower end side, a piston rod whose upper end is attached to an upper end of the outer tube, and a piston provided on a lower end of the piston rod. The front fork further includes a damping variable leg which is provided in the piston and includes a damping force variable device which controls a flow of a working medium sealed in the piston to make a damping force variable. The damping variable leg includes a conductor member whose upper end is attached to the piston and a coil conductor whose lower end is attached to a lower end of the inner tube, and the damping variable leg detects a stroke amount of the damping variable leg based on a change in an inductance generated in the coil conductor.

A device disclosed in JP-A-2016-194320 records a table in which a relationship between an output value of a sensor and an extension/contraction amount (stroke amount) of the front fork according to an amount of change in the inductance of the coil conductor is predetermined. However, in the device disclosed in JP-A-2016-194320, there is room for further improvement in that the output value of the sensor corresponding to an extension/contraction amount of a suspension device is accurately calculated.

SUMMARY OF THE INVENTION

An object of the present invention is to provide a calibration device and the like capable of improving an accuracy of an output value of a sensor corresponding to an extension/contraction amount of a suspension device.

Hereinafter, the present disclosure will be described.

An aspect of the present disclosure provides a calibration device including: a first coefficient calculation unit configured to calculate a first coefficient representing a relationship between a difference between a maximum output value and a minimum output value, and the minimum output value, according to a predetermined condition by using an inductance of a detector which detects an extension/contraction amount of a suspension device and a capacitance of a capacitor provided in a control device to which an output value of the detector is input, the maximum output value being an output value of the detector when the suspension device has a maximum extension/contraction amount, the minimum output value being an output value of the detector when the suspension device has a minimum extension/contraction amount; a first output unit configured to obtain a first output value by multiplying the first coefficient by a shortest output value specified to satisfy a predetermined condition by using the output value of the detector when the suspension device has the minimum extension/contraction amount; an ideal value calculation unit configured to calculate an ideal value of the output value of the detector when the extension/contraction amount of the suspension device is a first extension/contraction amount by using the first extension/contraction amount, an operation amount which is a difference between the maximum extension/contraction amount and the minimum extension/contraction amount of the suspension device, the shortest output value, and the first output value, the first extension/contraction amount being an extension/contraction amount of the suspension device in a state where a wheel connected to the suspension device is not grounded; a second coefficient calculation unit configured to calculate a second coefficient by dividing a second output value by the ideal value, the second output value being an actual output value of the detector when the extension/contraction amount of the suspension device is the first extension/contraction amount, and a calibration unit configured to calculate a calibration value which is an output value after calibration of the detector when the suspension device has the minimum extension/contraction amount, by using the second output value, the first extension/contraction amount, the operation amount, the first output value, and the second coefficient.

It is preferable that the first coefficient calculation unit calculates the first coefficient by using a plurality of inductances, a plurality of capacitances, and a least squares method.

It is preferable that the first output unit specifies an average value of output values of the detectors as the shortest output value when each of a plurality of suspension devices has a minimum extension/contraction amount.

Another aspect of the present disclosure provides a suspension system including: the calibration device according to the above aspect; a detector whose output value is calibrated by the calibration device; a suspension device whose extension/contraction amount is detected by the detector; and a suspension device which controls an initial load of the suspension device according to the detected extension/contraction amount.

Still another aspect of the present disclosure provides a saddle-type vehicle including: a vehicle body; a vehicle; and the suspension system according to the above aspect provided between the vehicle body and the vehicle.

Still another aspect of the present disclosure provides a calibration method including: a first coefficient calculation step of calculating a first coefficient representing a relationship between a difference between a maximum output value and a minimum output value, and the minimum output value, according to a predetermined condition by using an inductance of a detector which detects an extension/contraction amount of a suspension device and a capacitance of a capacitor provided in a control device to which an output value of the detector is input, the maximum output value being an output value of the detector when the suspension device has a maximum extension/contraction amount, the minimum output value being an output value of the detector when the suspension device has a minimum extension/contraction amount; a first output step of obtaining a first output value by multiplying the first coefficient by a shortest output value specified to satisfy a predetermined condition by using the output value of the detector when the suspension device has the minimum extension/contraction amount; an ideal value calculation step of calculating an ideal value of the output value of the detector when the extension/contraction amount of the suspension device is a first extension/contraction amount by using the first extension/contraction amount, an operation amount which is a difference between the maximum extension/contraction amount and the minimum extension/contraction amount of the suspension device, the shortest output value, and the first output value, the first extension/contraction amount being an extension/contraction amount of the suspension device in a state where a wheel connected to the suspension device is not grounded; a second coefficient calculation step of calculating a second coefficient by dividing a second output value by the ideal value, the second output value being an actual output value of the detector when the extension/contraction amount of the suspension device is the first extension/contraction amount; and a calibration step of calculating a calibration value which is an output value after calibration of the detector when the suspension device has the minimum extension/contraction amount, by using the second output value, the first extension/contraction amount, the operation amount, the first output value, and the second coefficient.

According to the present invention, it is possible to provide a calibration device and the like capable of improving an accuracy of an output value of a sensor corresponding to an extension/contraction amount of a suspension device.

BRIEF DESCRIPTION OF THE DRAWINGS

FIG. 1 is a view illustrating an example of a schematic configuration of a motorcycle 1 according to a first embodiment.

FIG. 7 is a diagram illustrating an example of contents stored in a storage unit 120.

FIG. 9 is a diagram illustrating a suspension 23 when a measurer measures a minimum output value Pm1 and when the measurer measures a maximum output value Px1.

DETAIL DESCRIPTION OF THE INVENTION

Hereinafter, embodiments of the present invention will be described in detail with reference to the accompanying drawings. The embodiment described below is an example of an embodiment of the present invention, and the present invention is not limited to the embodiment described below.

First Embodiment

FIG. 1 is a view illustrating an example of a schematic configuration of a motorcycle 1 according to a first embodiment.

Figure 2:
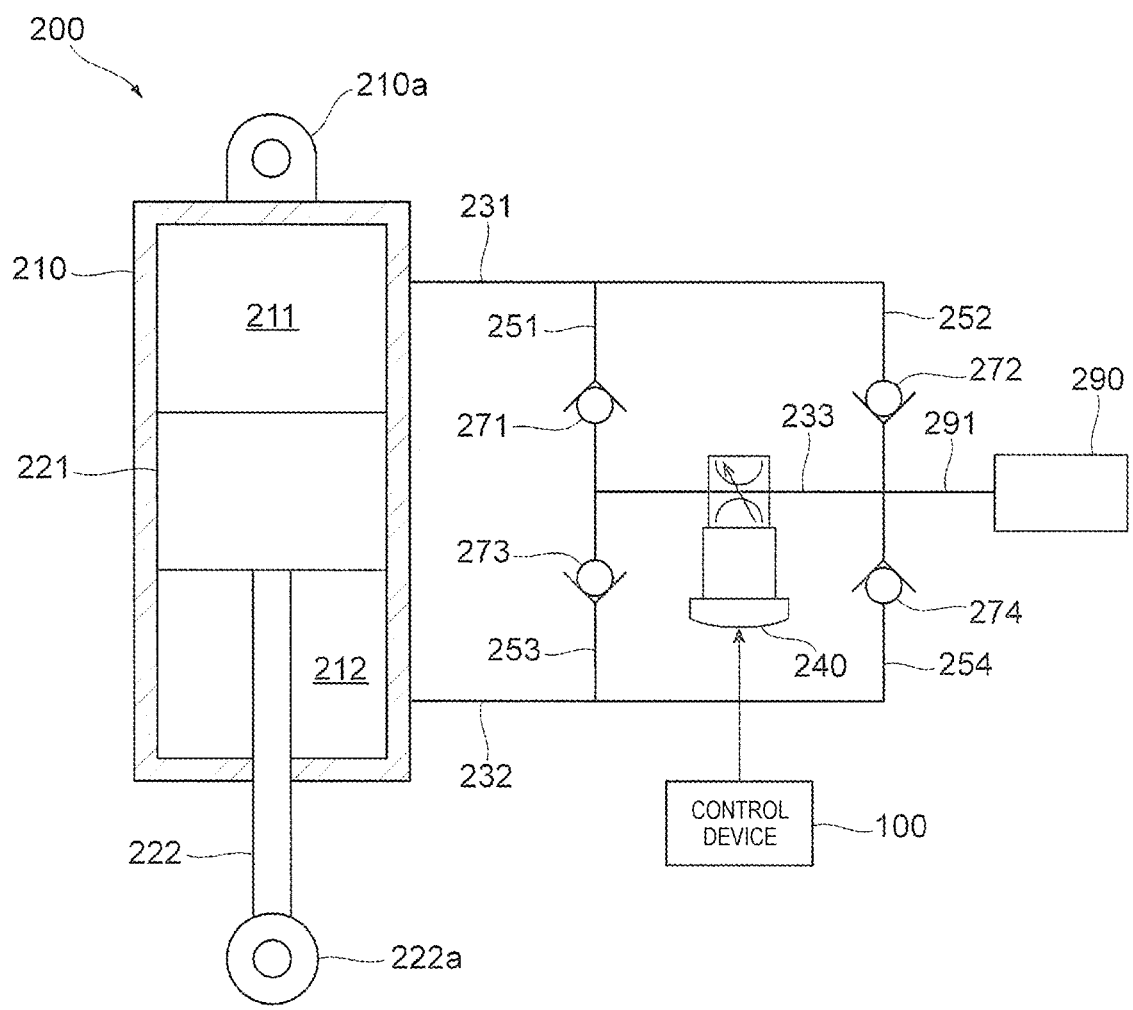
FIG. 2 is a diagram illustrating an example of a schematic configuration of an damping device 200.

FIG. 2 is a diagram illustrating an example of a schematic configuration of an damping device 200.

Figure 3:
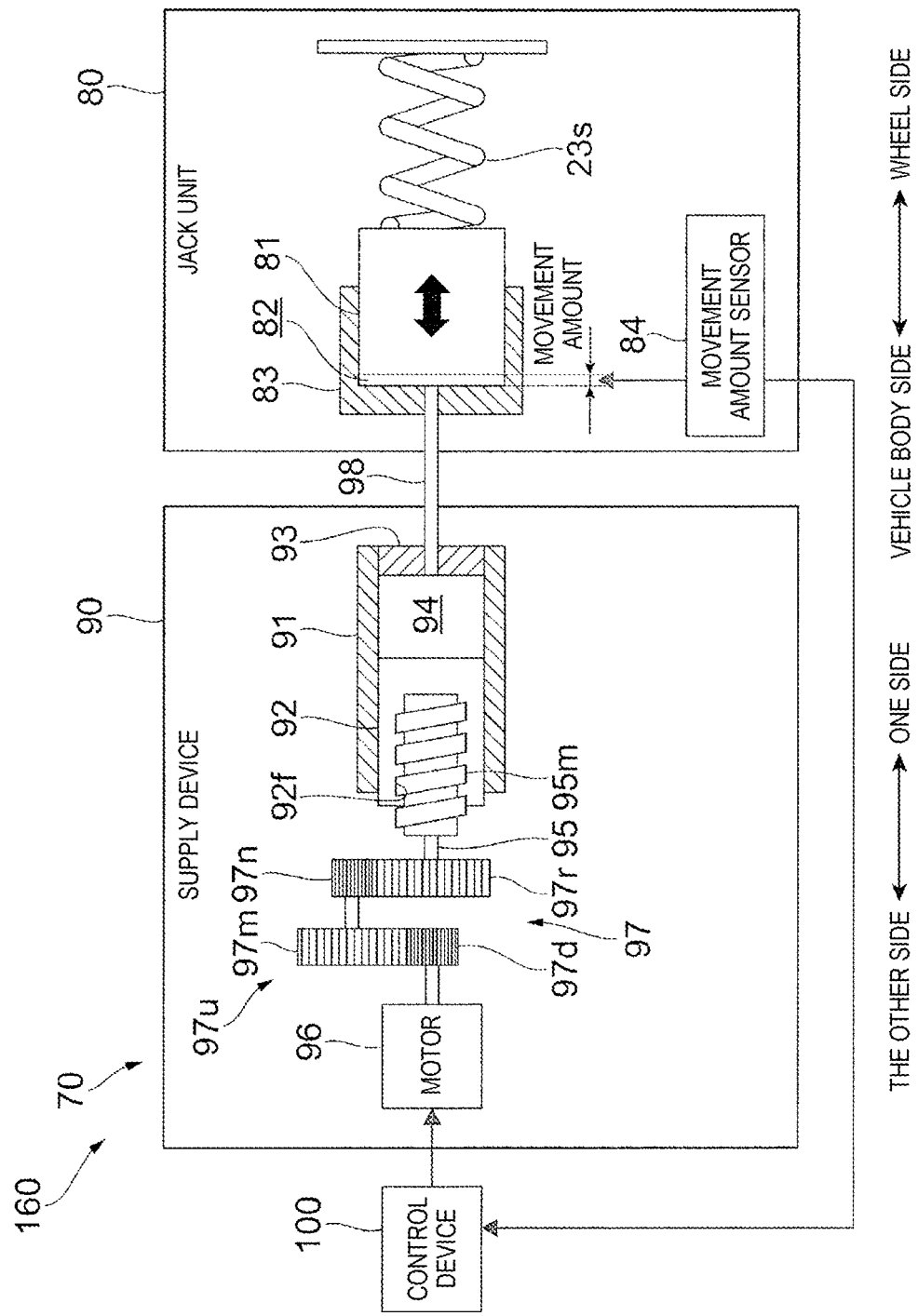
FIG. 3 is a diagram illustrating an example of a schematic configuration of a vehicle height adjustment device 160.

FIG. 3 is a diagram illustrating an example of a schematic configuration of a vehicle height adjustment device 160.

Figure 4:
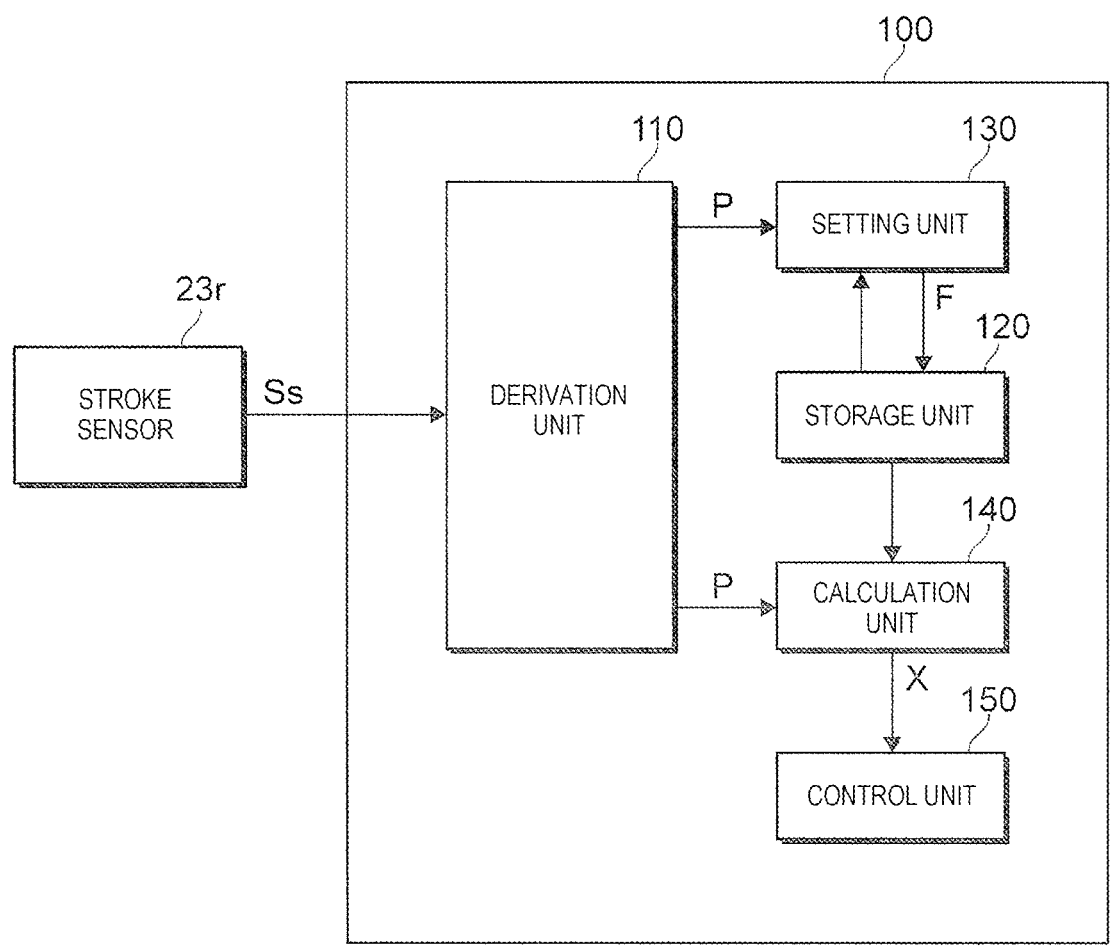
FIG. 4 is a diagram illustrating an example of a schematic configuration of a control device 100.

FIG. 4 is a diagram illustrating an example of a schematic configuration of a control device 100.

The motorcycle 1 includes a front wheel 2 which is a wheel on a front side, a rear wheel 3 which is a wheel on a rear side, and a vehicle body 10. The vehicle body 10 includes a vehicle body frame 11 forming a framework of the motorcycle 1, a handle 12, a brake lever 13, and a seat 14.

The motorcycle 1 includes suspensions 21 on a front wheel side which connect the front wheel 2 and the vehicle body 10. The motorcycle 1 includes two brackets 15 which hold two suspensions 21 disposed on the left and right of the front wheel 2, respectively, and a shaft 16 disposed between the two brackets 15. The shaft 16 is rotatably supported by the vehicle body frame 11. The suspension 21 includes a suspension spring 21s which absorbs an impact applied to the front wheel 2 from a road surface or the like, a damping device 21d which damps vibration of the suspension spring 21s, and a stroke sensor 21r which detects a stroke amount X of the suspension 21.

The motorcycle 1 includes a suspension 22 on a rear wheel side. The suspension 22 includes a suspension spring 22s which absorbs an impact applied to the rear wheel 3 from a road surface or the like, a damping device 22d which damps vibration of the suspension spring 22s, and a stroke sensor 22r which detects a stroke amount X of the suspension 22. The damping device 22d damps a force generated between the rear wheel 3 and the vehicle body 10.

In the following description, the front wheels 2 and the rear wheels 3 may be collectively referred to as a "wheel 4". The suspensions 21, 22 may be collectively referred to as a "suspension 23". The suspension spring 21s and the suspension spring 22s may be collectively referred to as a "spring 23s". The damping device 21d and the damping device 22d may be collectively referred to as a "damping device 200". The stroke sensor 21r and the stroke sensor 22r may be collectively referred to as a "stroke sensor 23r".

The stroke sensor 23r detects the stroke amount X, which is an extension/contraction amount of the suspension 23. The stroke amount X may be, for example, an amount by which the suspension 23 is extended from the most contracted state.

The motorcycle 1 includes an adjustment unit 70 which adjusts a height of vehicle body 10 by changing an initial load (preload) applied to spring 23s.

The motorcycle 1 includes a control device 100 which controls the initial load of the spring 23s.

A stroke signal Ss from the stroke sensor 23r is input to the control device 100. The stroke signal Ss is an output signal obtained by converting the stroke amount X of the suspension 23 detected by the stroke sensor 23r. The control device 100 controls the initial load of the spring 23s using a value specified based on the stroke signal Ss of the stroke sensor 23r. In the following description, a value specified based on the stroke signal Ss may be referred to as an output value P.

A suspension system 20 according to the present invention is a system including the suspension 23 and the control device 100.

(Damping Device 200)

Description will be made with reference to FIG. 2. The damping device 200 includes a cylinder 210 filled with oil, a piston 221 movably accommodated in the cylinder 210, and a piston rod 222 which holds the piston 221. An end portion 210a of the cylinder 210 is connected to the vehicle body 10. The piston rod 222 holds the piston 221 at an end portion of the piston rod 222, and an end portion 222a on an opposite side is connected to the wheel 4. The damping device according to the present invention is not limited to such a configuration. In the damping device according to the present invention, the end portion of the cylinder 210 may be connected to the wheel 4, the end portion of the piston rod 222 may hold the piston 221, and the end portion of the piston rod 222 on the opposite may be connected to the vehicle body 10.

In the damping device 200, a contraction stroke in which an entire length of the damping device 200 is shortened is performed by movement of the piston 221 toward the end portion 210a, and an extension stroke in which an entire length of the damping device 200 is extended is performed by movement of the piston 221 toward an opposite side.

Since the piston 221 is accommodated in the cylinder 210, inside of the cylinder 210 is divided into an oil chamber 211 in which a pressure of the oil increases in the contraction stroke and an oil chamber 212 in which a pressure of the oil increases in the extension stroke.

The damping device 200 includes a first oil passage 231 connected to the oil chamber 211 in the cylinder 210, and a second oil passage 232 connected to the oil chamber 212 in the cylinder 210. The damping device 200 includes a third oil passage 233 provided between the first oil passage 231 and the second oil passage 232, and a control valve 240 provided in the third oil passage 233. The damping device 200 includes a first branch passage 251 and a second branch passage 252 which connect the first oil passage 231 and the third oil passage 233. The damping device 200 includes a third branch passage 253 and a fourth branch passage 254 which connect the second oil passage 232 and the third oil passage 233.

The damping device 200 includes a first check valve 271 which is provided in the first branch passage 251, allows the oil to move from the first oil passage 231 toward the third oil passage 233, and prohibits the oil from moving from the third oil passage 233 toward the first oil passage 231. The damping device 200 includes a second check valve 272 which is provided in the second branch passage 252, allows the oil to move from the third oil passage 233 toward the first oil passage 231, and prohibits the oil from moving from the first oil passage 231 toward the third oil passage 233.

The damping device 200 includes a third check valve 273 which is provided in the third branch passage 253, allows the oil to move from the second oil passage 232 toward the third oil passage 233, and prohibits the oil from moving from the third oil passage 233 toward the second oil passage 232. The damping device 200 includes a fourth check valve 274 which is provided in the fourth branch passage 254, allows the oil to move from the third oil passage 233 toward the second oil passage 232, and prohibits the oil from moving from the second oil passage 232 toward the third oil passage 233.

The damping device 200 includes a reservoir 290 which stores the oil and has a function of supplying and discharging the oil, and a reservoir passage 291 which connects the reservoir 290 and the third oil passage 233.

The control valve 240 has a solenoid, and can control a pressure of the oil passing through the valve by controlling an amount of a current supplied to the solenoid. The control valve 240 increases the pressure of the oil passing through the valve as the amount of the current supplied to the solenoid increases. The amount of the current supplied to the solenoid is controlled by the control device 100.

(Adjustment Unit 70)

Description will be made with reference to FIGS. 1 and 3. The adjustment unit 70 includes a jack unit 80 which is provided in the suspension 23 and adjusts a length of the spring 23s, and a supply device 90 which supplies oil to a jack chamber 82 of the jack unit 80.

As illustrated in FIG. 3, the jack unit 80 includes a support member 81 which supports an end portion of the spring 23s on a vehicle body 10 side, and a forming member 83 which forms the jack chamber 82 together with the support member 81. The jack unit 80 adjusts the length of the spring 23s by moving the support member 81 according to an amount of the oil in the jack chamber 82.

The jack unit 80 includes a movement amount sensor 84 which detects a movement amount of the support member 81. The movement amount of the support member 81 detected by the movement amount sensor 84 is a movement amount in a case where a movement amount when the support member 81 is located at a reference position is set to 0. The reference position is, for example, a position of the support member 81 when the oil in the jack chamber 82 is 0. The movement amount sensor 84 may be, for example, a sensor which winds a coil around an outer peripheral surface of the forming member 83, uses the support member 81 as a magnetic body, and detects the movement amount of the support member 81 using an inductance of the coil which changes depending on movement of the support member 81 with respect to the forming member 83.

As illustrated in FIG. 3, the supply device 90 includes a cylindrical cylinder 91, a cylindrical piston 92 which slides in the cylinder 91, and a disc-shaped lid portion 93 which closes an end portion on one side of the cylinder 91. A storage chamber 94 which stores oil is formed in a space surrounded by the cylinder 91, the piston 92, and the lid portion 93. The piston 92 is provided with a columnar recess recessed from an end surface on the other side, and a female screw 92f is formed in the recess.

As illustrated in FIG. 3, the supply device 90 includes a screw member 95 provided with a male screw 95m which meshes with the female screw 92f formed in the piston 92. The supply device 90 includes a motor 96 which rotates the screw member 95, and a deceleration unit 97 which decelerates a rotation speed and transmits a driving force of the motor 96 to the screw member 95.

The motor 96 may be, for example, a direct-current (DC) motor with a brush. Driving of the motor 96 is controlled by the control device 100. As illustrated in FIG. 3, the deceleration unit 97 includes a drive gear 97d mounted on an output shaft of the motor 96, a driven gear 97r mounted on the screw member 95, and a gear unit 97u having a first intermediate gear 97m meshing with the drive gear 97d and a second intermediate gear 97n meshing with the driven gear 97r.

The supply device 90 includes a hose 98 which is provided between the storage chamber 94 and the jack chamber 82 of the jack unit 80 and allows the oil to flow between the storage chamber 94 and the jack chamber 82.

In the adjustment unit 70, the motor 96 of the supply device 90 rotates in one direction, so that the piston 92 discharges the oil from the storage chamber 94. Accordingly, the oil is supplied into the jack chamber 82 via the hose 98. When the oil is supplied to the jack chamber 82, the support member 81 moves to a wheel side with respect to the forming member 83, in other words, the movement amount of the support member 81 from the reference position increases, and a spring length of the spring 23s is reduced.

When the spring length of the spring 23s is reduced, a force with which the spring 23s presses the support member 81 becomes larger than that before the support member 81 moves with respect to the forming member 83. As a result, even if a force acts from the vehicle body toward the wheel side, the initial load which does not change relative positions of the vehicle body and the wheel increases. In such a case, when the same force acts on a wheel 4 side from a vehicle body 10 side, a change in a distance between the vehicle body 10 and the wheel 4 is small. Therefore, when the spring length of the spring 23s is reduced by the movement of the support member 81 with respect to the forming member 83, a height of the vehicle body 10 is increased as compared with that before the movement of the support member 81 with respect to the forming member 83.

On the other hand, when the motor 96 of the supply device 90 rotates in the other direction, a volume of the storage chamber 94 increases. Then, the support member 81 discharges the oil in the jack chamber 82 and supplies the oil to the storage chamber 94. Accordingly, the support member 81 moves toward the vehicle body with respect to the forming member 83, in other words, the movement amount of the support member 81 from the reference position decreases, and the spring length of the spring 23s is increased.

When the spring length of the spring 23s is increased, a spring force of the spring 23s pressing the support member 81 becomes smaller than that before the support member 81 moves with respect to the forming member 83. As a result, when the same force acts on the wheel 4 side from the vehicle body 10 side, a sinking amount of the suspension 23 increases. Therefore, when the spring length of the spring 23s is increased by the movement of the support member 81 with respect to the forming member 83, the height of the vehicle body 10 is lowered as compared with that before the movement of the support member 81 with respect to the forming member 83.

The adjustment unit 70 configured as described above, the control device 100, and the like constitute the vehicle height adjustment device 160 which adjusts a vehicle height of the motorcycle 1.

(Control Device 100)

Description will be made with reference to FIGS. 1 and 4. The control device 100 as an example of a calibration device is an arithmetic logic operation circuit including a CPU, a ROM, a RAM, a backup RAM, and the like.

The stroke signal Ss from the stroke sensor 23r is input to the control device 100.

The control device 100 includes a derivation unit 110 which calculates the output value P of the stroke sensor 23r based on the stroke signal Ss from the stroke sensor 23r. The control device 100 includes a storage unit 120 which stores data. The control device 100 includes a setting unit 130 which sets a relationship between the output value P of the stroke sensor 23r and the stroke amount X of the suspension 23. The control device 100 includes a calculation unit 140 which calculates the stroke amount X of the suspension 23, and a control unit 150 which controls an initial load of the spring 23s of the suspension 23.

When receiving the stroke signal Ss from the stroke sensor 23r, the derivation unit 110 calculates the output value P of the stroke sensor 23r based on the received stroke signal Ss. The derivation unit 110 transmits the calculated output value P of the stroke sensor 23r to the setting unit 130 or the calculation unit 140. More specifically, when the relationship between the output value P of the stroke sensor 23r and the stroke amount X of the suspension 23 is not set in the setting unit 130, the derivation unit 110 transmits the output value P of the stroke sensor 23r to the setting unit 130. In contrast, when the relationship between the output value P of the stroke sensor 23r and the stroke amount X of the suspension 23 is set in the setting unit 130, the derivation unit 110 transmits the output value P of the stroke sensor 23r to the calculation unit 140.

Figure 5:
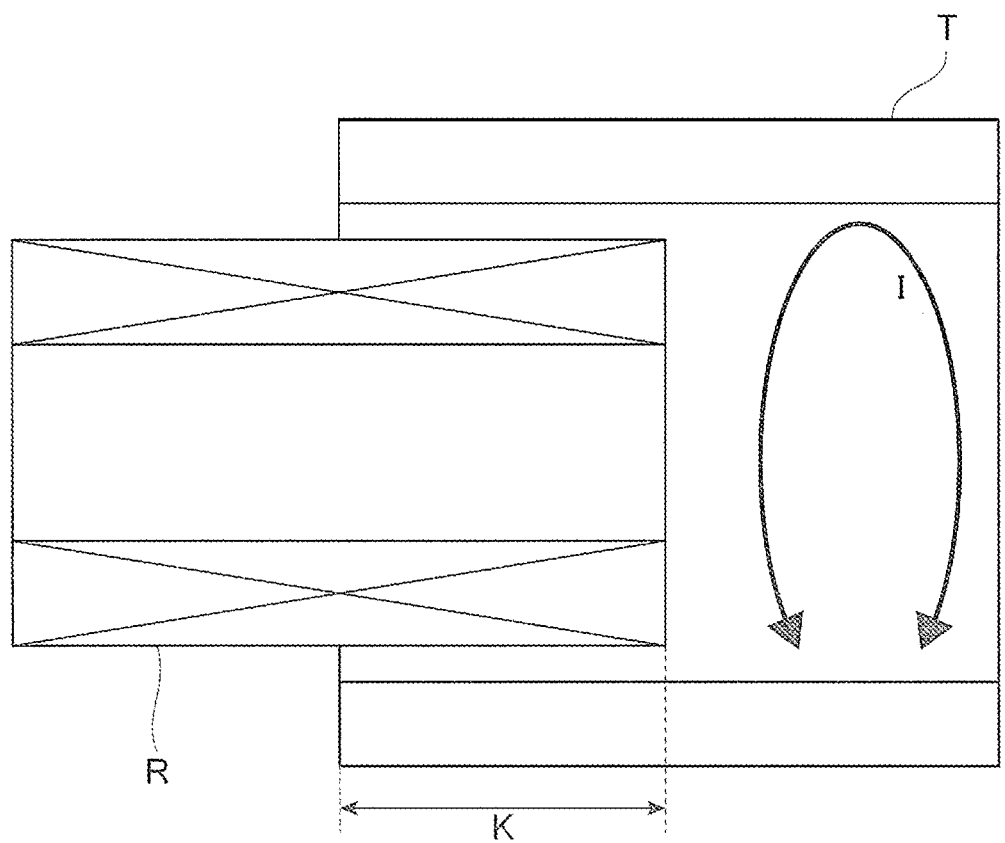
FIG. 5 is a diagram illustrating an operation principle of a stroke sensor 23r.

FIG. 5 is a diagram illustrating an operation principle of the stroke sensor 23r according to the present embodiment.

In the illustrated example, a cylindrical conductor T and a coil R are fitted to each other, and a fitting length (overlapping length) is K.

Here, the conductor T can be connected to, for example, the piston 221, and the coil R can be a coil incorporated in the cylinder 210. In this case, the fitting length K corresponds to an overlapping length in an upper-lower direction of the conductor T connected to the piston 221 and the coil incorporated in the cylinder 210. In addition, for example, one of two members which move in response to extension and contraction of the suspension may be used as a conductor, and a coil may be provided as the other. An in-outside relationship between the conductor T and the coil R and an in-outside relationship between the conductor T connected to the piston 221 and the coil incorporated in the cylinder 210 are opposite to each other as illustrated in FIGS. 2 and 5. However, this difference does not affect the description here.

The fitting length K changes depending on the stroke amount X of the suspension 23. When the suspension 23 is extended, the fitting length K becomes shorter, whereas when the suspension 23 is contracted, the fitting length K becomes longer.

At this time, when an alternating current passes through the coil R, an eddy current I is generated in the conductor T so as to cancel a fluctuation of a magnetic field. When the eddy current I is generated, a strength of the magnetic field generated around the coil R is weakened by an action of the eddy current I. That is, an inductance of the coil R apparently decreases due to the eddy current I. When the fitting length K is short (when the suspension is extended), an influence of the eddy current I is small, and thus the inductance becomes larger. In contrast, when the fitting length K is long (when the suspension is contracted), the influence of the eddy current I is large, and thus the inductance becomes smaller.

A resonance frequency of an LC oscillation circuit changes depending on the inductance of the coil R. Specifically, a relationship among a resonance frequency $f_0$, an inductance L of the coil, and a capacitance C of a capacitor is $f_0 = 1/(2\pi\sqrt{(LC)})$. That is, when the inductance L of the coil R is large, the resonance frequency becomes small. In contrast, when the inductance L of the coil R is small, the resonance frequency increases. Therefore, the stroke amount X of the suspension 23 can be obtained from the resonance frequency.

(Derivation Unit 110)

Figure 6:
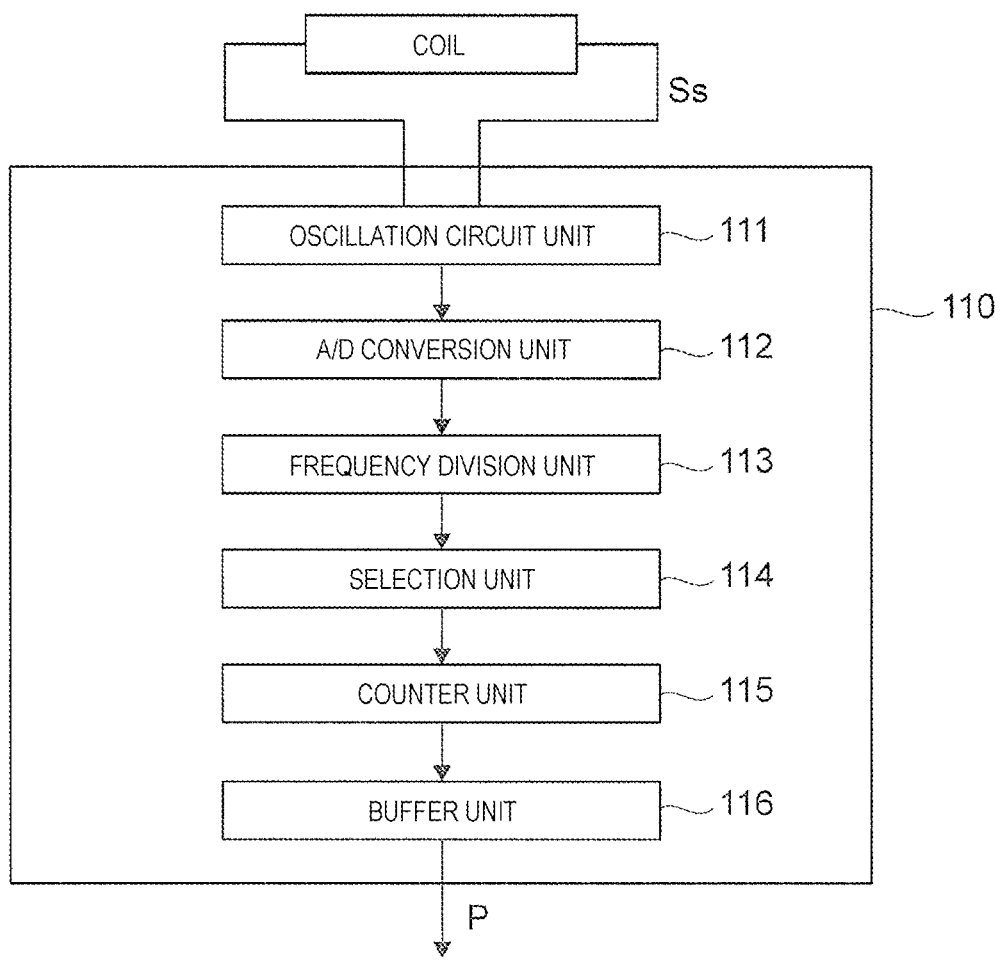
FIG. 6 is a block diagram illustrating an example of a configuration of a derivation unit 110.

FIG. 6 is a block diagram illustrating an example of a configuration of the derivation unit 110 according to the present embodiment.

The derivation unit 110 illustrated includes an oscillation circuit unit 111, an A/D conversion unit 112, a frequency division unit 113, a selection unit 114, a counter unit 115, and a buffer unit 116.

The oscillation circuit unit 111 is electrically connected to the above-described coil via a signal line, and includes a capacitor constituting an LC oscillation circuit. An alternating current having a predetermined resonance frequency is output from the LC oscillation circuit. In the present embodiment, the resonance frequency changes depending on the stroke amount X of the suspension 23.

The A/D conversion unit 112 shapes an oscillation waveform output from the oscillation circuit unit 111, and converts the oscillation waveform from an analog signal to a digital signal to obtain a shaped waveform. The A/D conversion unit 112 is a comparator which converts the analog signal into a 1-bit digital signal.

The frequency division unit 113 divides a frequency of the signal digitized by the A/D conversion unit 112 to obtain a frequency-divided waveform.

The frequency division unit 113 divides the frequency, for example, at four frequency division ratios, and outputs the result. The division ratio is, for example, $2^n$ (n is an integer), and is selected from 1 to 4096. In the present embodiment, 32 ($=2^5$), 64 ($=2^6$), 128 ($=2^7$), and 256 ($=2^8$) are selected as the frequency division ratios.

As the A/D conversion unit 112 and the frequency division unit 113, for example, a binary counter can be used.

The selection unit 114 selects one of the frequency-divided waveforms output by the frequency division unit 113.

When the selection unit 114 selects the frequency-divided waveform, a frequency of the frequency-divided waveform can be kept within a relatively narrow range even in a case where a fluctuation of a frequency of the oscillation waveform output from the oscillation circuit unit 111 is large and a dynamic range is wide.

The counter unit 115 counts an edge interval of the frequency-divided waveform selected by the selection unit 114 by a counter using a crystal oscillator or the like. Then, a period of the edge interval of the frequency-divided waveform is measured from the count number. The edge interval may be, for example, an interval of one cycle of the frequency-divided waveform. Therefore, in this case, the counter unit 115 calculates time of one cycle of the frequency-divided waveform. This time can be considered as the output value P of the stroke sensor 23r.

The buffer unit 116 stores the time of one cycle measured by the counter unit 115 in the newest order by a predetermined number. The buffer unit 116 may be, for example, a ring buffer. In this case, when the newly measured time of one cycle is stored, the time of one cycle measured at the oldest time is erased.

(Storage Unit 120)

FIG. 7 is a diagram illustrating an example of contents stored in the storage unit 120.

The storage unit 120 stores information used by the setting unit 130 and information used by the calculation unit 140. More specifically, the storage unit 120 stores a minimum output value Pm1, a subtraction value D1, an output value coefficient A1, a shortest output value P1, an output value P0, a stroke amount X1, a stroke-possible amount X0, an ideal output value P2, an output value P3, an output value coefficient A2, a calibration value P4, and a relational expression F. Hereinafter, a method for calculating the minimum output value Pm1, the subtraction value D1, the output value coefficient A1, the shortest output value P1, the output value P0, the stroke amount X1, the stroke-possible amount X0, the ideal output value P2, the output value P3, the output value coefficient A2, the calibration value P4, and the relational expression F will be described.

Figure 8:
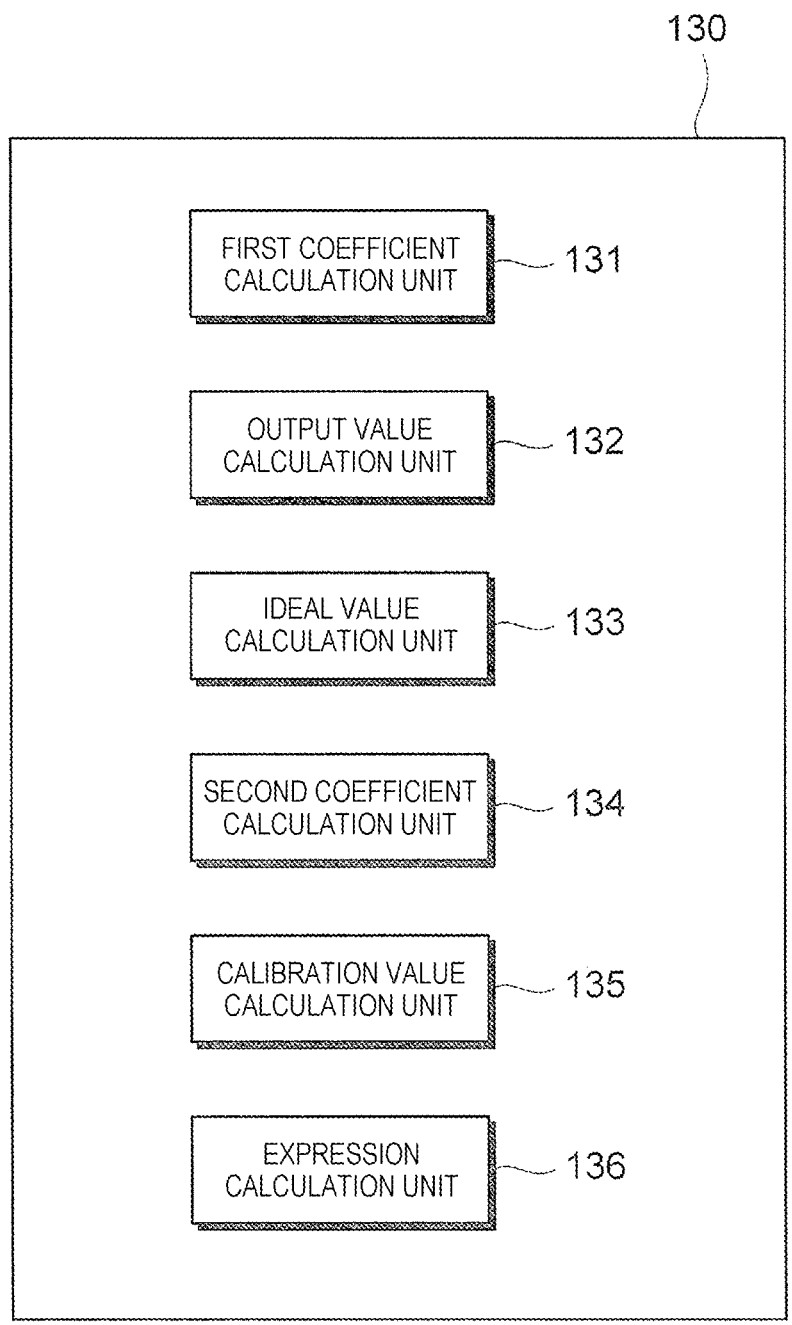
FIG. 8 is a block diagram illustrating an example of a configuration of a setting unit 130.

FIG. 8 is a block diagram illustrating an example of a configuration of the setting unit 130 according to the present embodiment.

FIG. 9 is a diagram illustrating the suspension 23 when a measurer measures the minimum output value Pm1 and when the measurer measures a maximum output value Px1.

The setting unit 130 illustrated in FIG. 8 includes a first coefficient calculation unit 131, an output value calculation unit 132, an ideal value calculation unit 133, a second coefficient calculation unit 134, a calibration value calculation unit 135, and an expression calculation unit 136.

(First Coefficient Calculation Unit 131)

The first coefficient calculation unit 131 calculates the output value coefficient A1. Hereinafter, a method for calculating the output value coefficient A1 will be described.

The measurer measures the minimum output value Pm1 and the subtraction value D1 used for calculating the output value coefficient A1. The minimum output value Pm1 is an output value P of the stroke sensor 23r when the suspension 23 which is not attached to the motorcycle 1 is most contracted. The subtraction value D1 is a value obtained by subtracting the minimum output value Pm1 from the maximum output value Px1. The maximum output value Px1 is an output value P of the stroke sensor 23r when the suspension 23 which is not attached to the motorcycle 1 is most extended. Therefore, the subtraction value D1 is also regarded as a range of the output value P which can be taken by the stroke sensor 23r.

An extension and contraction means (not illustrated) which extends and contracts the suspension 23 by applying a load to the suspension 23 can be used to measure the minimum output value Pm1 and the maximum output value Px1.

In the present embodiment, three control devices 100 and three stroke sensors 23r are used to measure the minimum output value Pm1 and the maximum output value Px1.

The measurer determines any control device 100 as a first control device 100 to be used for measuring the minimum output value Pm1 and the maximum output value Px1. A theoretical value of the capacitance C of the capacitor in the determined first control device 100 is defined as a theoretical value C0. An upper limit value of the capacitance C of the capacitor in the first control device 100 is defined as an upper limit value C1. Here, the upper limit value C1 is a value obtained by adding a tolerance of the capacitance C of the capacitor to the theoretical value C0 (C1=C0+tolerance). A lower limit value of the capacitance C of the capacitor in the first control device 100 is defined as a lower limit value C2. Here, the lower limit value C2 is a value obtained by subtracting the tolerance of the capacitance C of the capacitor from the theoretical value C0 (C2=C0−tolerance). For example, values described in a specification of the control device 100 are used as the theoretical value C0 of the capacitance C and the tolerance of the capacitance C.

The measurer determines the control device 100, in which the upper limit value C1 of the capacitance C of the capacitor in the first control device 100 is defined as a theoretical value, as a second control device 100 to be used for measurement. The measurer determines the control device 100, in which the lower limit value C2 of the capacitance C of the capacitor in the first control device 100 is defined as a theoretical value, as a third control device 100 to be used for measurement.

The measurer determines any stroke sensor 23r as a first stroke sensor 23r to be used for measuring the minimum output value Pm1 and the maximum output value Px1. A theoretical value of the inductance L in the first stroke sensor 23r is defined as a theoretical value L0. An upper limit value of the inductance L in the first stroke sensor 23r is defined as an upper limit value L1. Here, the upper limit value L1 is a value obtained by adding a tolerance of the inductance L of the stroke sensor 23r to the theoretical value L0 (L1=L0+tolerance). A lower limit value of the inductance L in the first stroke sensor 23r is defined as a lower limit value L2. Here, the lower limit value L2 is a value obtained by subtracting the tolerance of the inductance L of the stroke sensor 23r from the theoretical value L0 (L2=L0−tolerance). For example, values described in a specification of the stroke sensor 23r are used as the theoretical value L0 of the inductance L and the tolerance of the inductance L.

The measurer determines the stroke sensor 23r, in which the upper limit value L1 of the inductance L in the first stroke sensor 23r is defined as a theoretical value, as a second stroke sensor 23r to be used for measurement. The measurer determines the stroke sensor 23r, in which the lower limit value L2 of the inductance L in the first stroke sensor 23r is defined as a theoretical value, as a third stroke sensor 23r used for measurement.

The measurer measures the minimum output value Pm1 and the maximum output value Px1 using one of the three control devices 100 and one of the three stroke sensors 23r. The measurer subtracts the measured minimum output value Pm1 from the measured maximum output value Px1 to obtain the subtraction value D1.

The measurer measures the minimum output value Pm1 and the maximum output value Px1 using each of combinations of the three control devices 100 and the three stroke sensors 23r, and calculates the subtraction value DE In other words, the minimum output value Pm1 and the maximum output value Px1 are measured using each of the combinations of the control device 100 and the stroke sensor 23r, and the subtraction value D1 is calculated, in which there are nine combinations of the capacitance C and the inductance L of the capacitor. The nine combinations of the capacitance C and the inductance L of the capacitor are (C0, L0), (C0, L1), (C0, L2), (C1, L0), (C1, L1), (C1, L2), (C2, L0), (C2, L1), and (C2, L2).

By nine measurements, nine minimum output values Pm1 (C0, L0), Pm1 (C0, L1), Pm1 (C0, L2), Pm1 (C1, L0), Pm1 (C1, L1), Pm1 (C1, L2), Pm1 (C2, L0), Pm1 (C2, L1), and Pm1 (C2, L2) are obtained. In addition, nine maximum output values Px1 (C0, L0), Px1 (C0, L1), Px1 (C0, L2), Px1 (C1, L0), Px1 (C1, L1), Px1 (C1, L2), Px1 (C2, L0), Px1 (C2, L1), and Px1 (C2, L2) are obtained. Further, nine subtraction values D1 (C0, L0), D1 (C0, L1), D1 (C0, L2), D1 (C1, L0), D1 (C1, L1), D1 (C1, L2), D1 (C2, L0), D1 (C2, L1), and D1 (C2, L2) are obtained.

Figure 10:
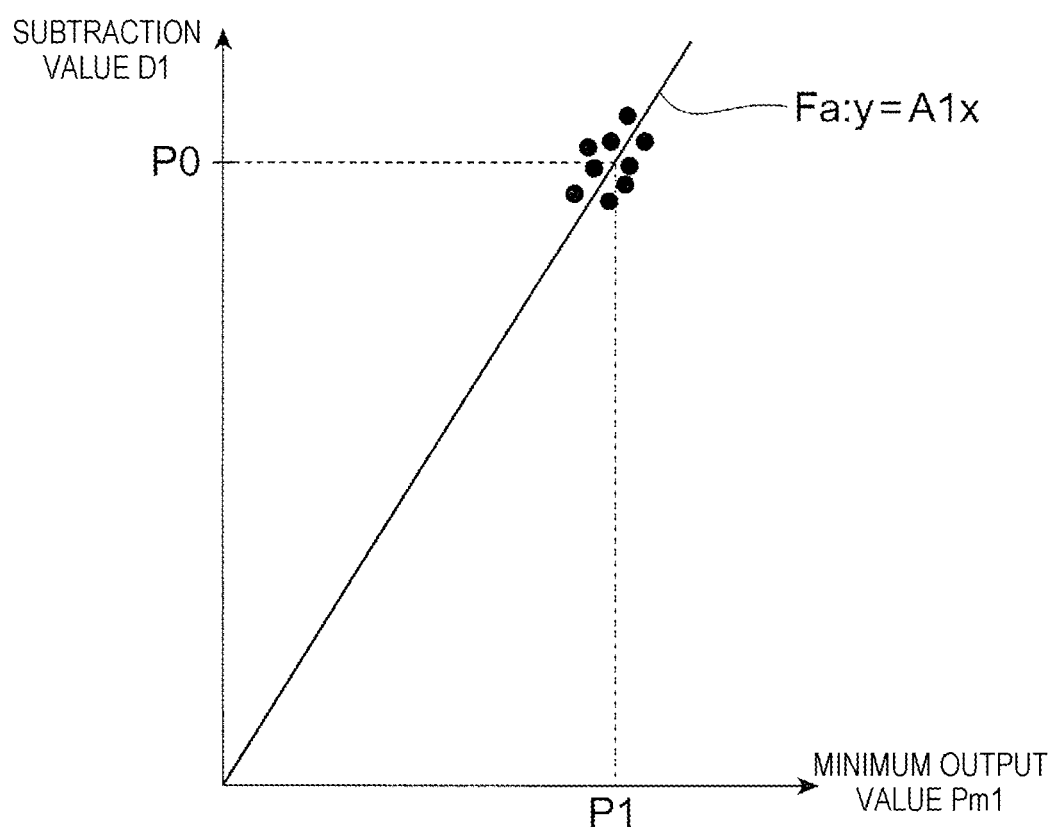
FIG. 10 is a diagram illustrating a relationship between the minimum output value Pm1 and a subtraction value D1.

FIG. 10 is a diagram illustrating a relationship between the minimum output value Pm1 and the subtraction value DE In FIG. 10, an x-axis, which is a horizontal axis, is the minimum output value Pm1, and a y-axis, which is a vertical axis, is the subtraction value DE In FIG. 10, nine points are illustrated. Each point is located at a coordinate where a value of the x-axis is the minimum output value Pm1, and is located at a coordinate where a value of the y-axis is the subtraction value D1. The minimum output value Pm1 and the subtraction value D1 corresponding to each point are values obtained by each of the above-described nine measurements.

The first coefficient calculation unit 131 calculates a relationship between the minimum output value Pm1 and the subtraction value D1 illustrated in FIG. 10. More specifically, the first coefficient calculation unit 131 obtains an approximate linear expression Fa (y=A1x) passing through an origin by using the least squares method for the nine points illustrated in FIG. 10. Then, a slope in the obtained approximate linear expression Fa is determined as the output value coefficient A1. In this way, in the present embodiment, the relationship between the minimum output value Pm1 and the subtraction value D1 is set based on a fact that the minimum output value Pm1 indicated by the x-axis and the subtraction value D1 indicated by the y-axis in FIG. 10 have a linear relationship. In the present embodiment, the approximate linear expression is made a straight line passing through the origin based on a fact that when the minimum output value Pm1 is 0, the subtraction value D1 is also 0.

(Output Value Calculation Unit 132)

The output value calculation unit 132 calculates the output value P0. Hereinafter, a method for calculating the output value P0 will be described.

The measurer calculates the shortest output value P1 used for calculating the output value P0. The shortest output value P1 is a value obtained by using the control device 100 in which the capacitance of the capacitor is C0.

The measurer measures the minimum output values Pm1 for the plurality of suspensions 23.

The measurer calculates the minimum output values Pm1 for the plurality of suspensions 23 using the control device 100 in which the capacitance of the capacitor is C0, and sets the calculated average value as the shortest output value P1. The measurer inputs the calculated shortest output value P1 to the storage unit 120 of the control device 100.

The output value calculation unit 132 calculates the output value P0 based on the output value coefficient A1 and the shortest output value P1. More specifically, the output value P0 is calculated by P0=A1×P1. The output value calculation unit 132 stores the calculated output value P0 in the storage unit 120 of the control device 100.

(Ideal Value Calculation Unit 133)

Figure 11:
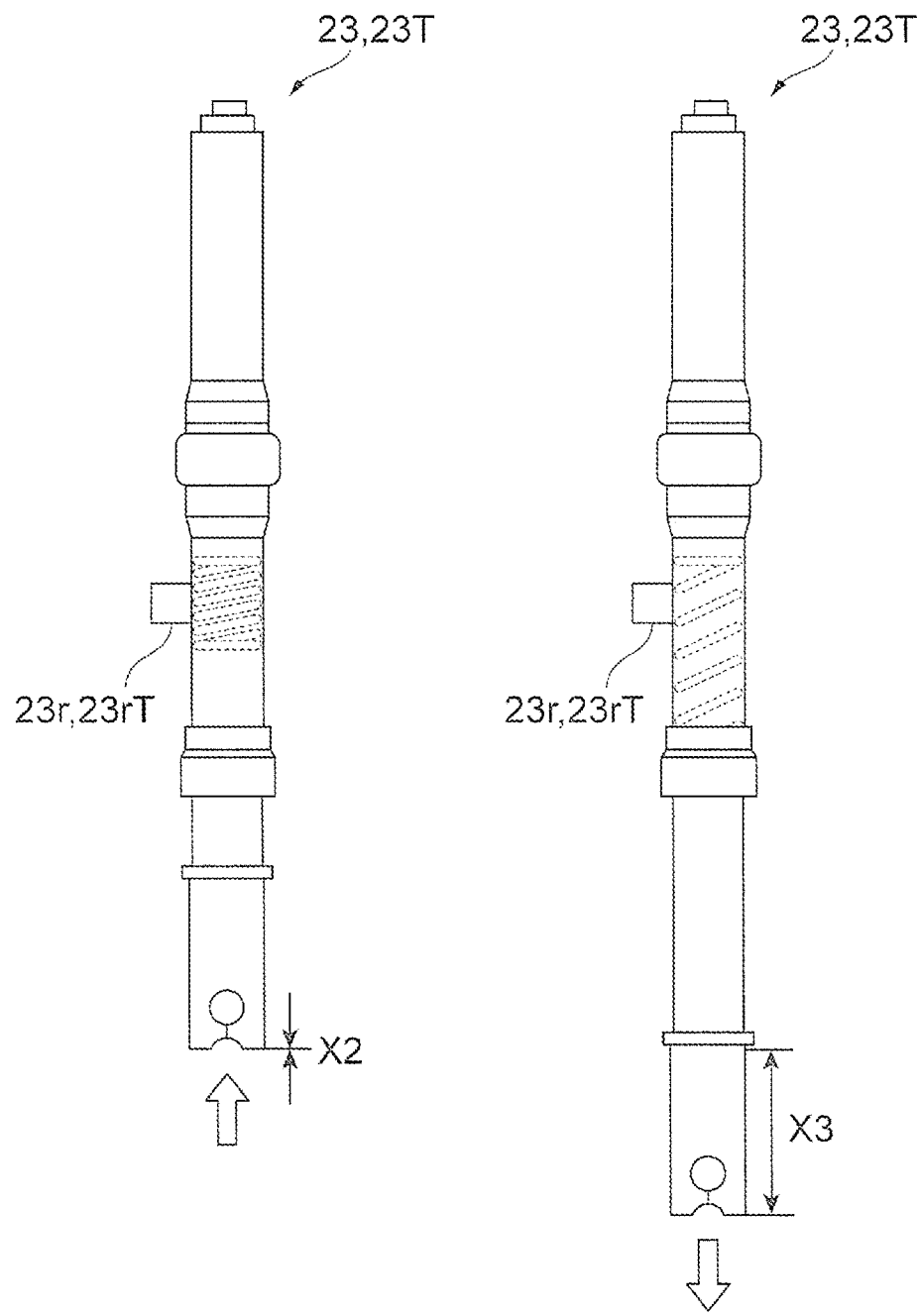
FIG. 11 is a view illustrating the suspension 23 when the measurer measures a stroke amount X2 and when the measurer measures a stroke amount X3.

FIG. 11 is a view illustrating the suspension 23 when the measurer measures a stroke amount X2 and when the measurer measures a stroke amount X3.

The ideal value calculation unit 133 calculates the ideal output value P2 by the following method.

The measurer determines the stroke amount X1 and the stroke-possible amount X0 which are used to calculate the ideal output value P2. The stroke amount X1 and the stroke-possible amount X0 are values set for the suspension 23 for which a relationship between the output value P and the stroke amount X is to be set. In the following description, the suspension 23 for which the relationship between the output value P and the stroke amount X is to be set may be referred to as a suspension 23T. In the following description, the stroke sensor 23r provided in the suspension 23T may be referred to as a stroke sensor 23rT.

The stroke amount X1 is the stroke amount X of the suspension 23T when a load G is applied and the suspension 23T is extended. The load G will be described later. The measurer can calculate the stroke amount X1 based on a design value of the suspension 23T, for example.

The measurer measures the stroke amount X2 and the stroke amount X3 of the suspension 23T. The stroke amount X2 is the stroke amount X of the suspension 23T when the suspension 23T which is not attached to the motorcycle 1 is most contracted. The stroke amount X3 is the stroke amount X of the suspension 23T when the suspension 23T which is not attached to the motorcycle 1 is most extended. An extension and contraction means that extends and contracts the suspension 23T by applying a load to the suspension 23T can be used to measure the stroke amount X2 and the stroke amount X3.

The measurer determines a value obtained by subtracting the stroke amount X2 from the calculated stroke amount X3 as the stroke-possible amount X0. That is, the stroke-possible amount X0 is a range of the stroke amount X which can be taken by the suspension 23T.

The measurer inputs the determined stroke amount X1 and the stroke-possible amount X0 to the storage unit 120 of the control device 100.

The ideal value calculation unit 133 calculates the ideal output value P2 based on the output value P0, the shortest output value P1, the stroke amount X1, and the stroke-possible amount X0. More specifically, the ideal value calculation unit 133 calculates the ideal output value P2 by the following equation (1).

$$P2 = P1 + P0 \times (X1/X0) \quad (1)$$

Here, the ideal output value P2 is an ideal value of the output value P of the stroke sensor $23rT$ when the stroke amount X of the suspension 23T is the stroke amount X1. The ideal value is the output value P of the stroke sensor $23rT$ when no error occurs in the output value P of the stroke sensor $23rT$.

(Second Coefficient Calculation Unit 134)

Figure 12:
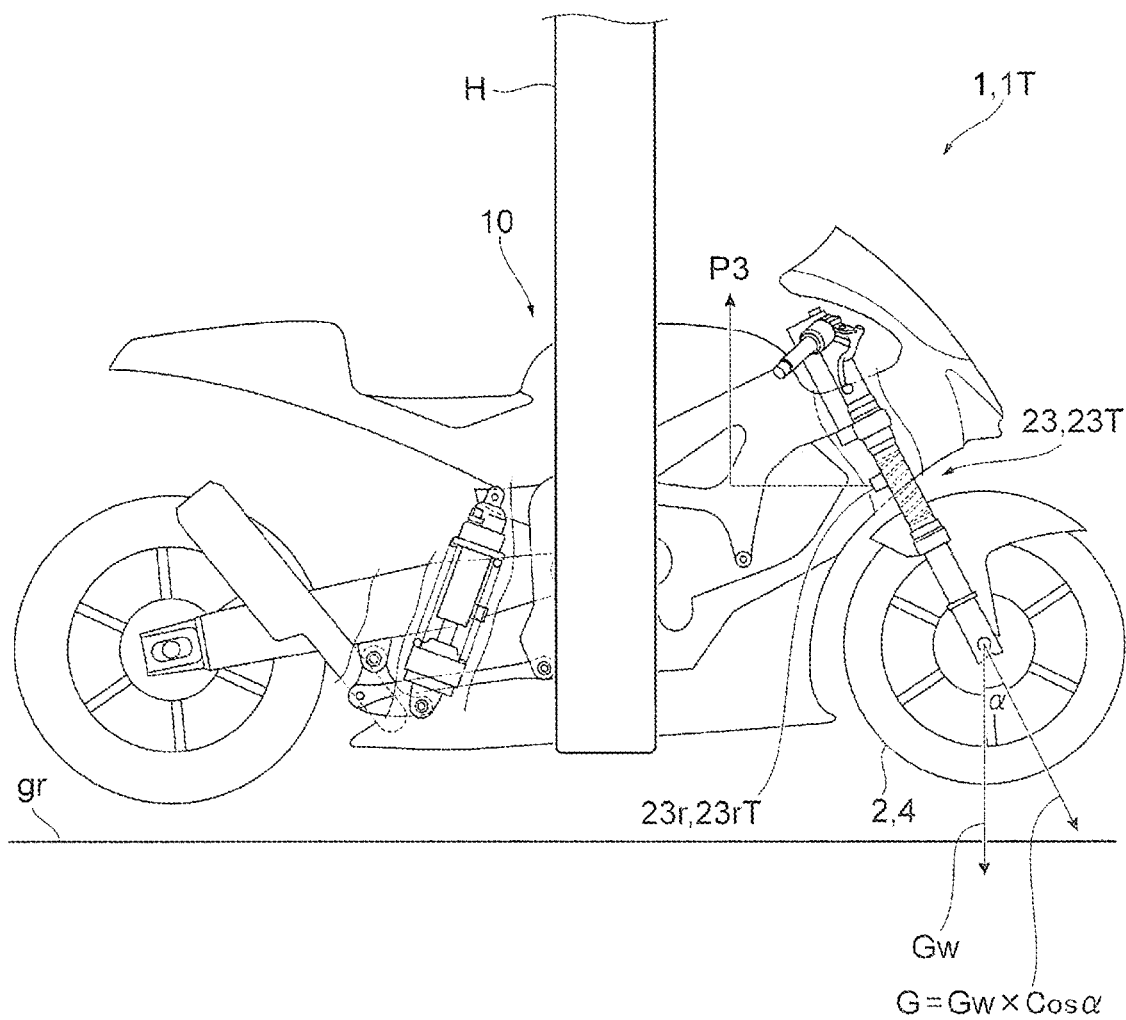
FIG. 12 is a view illustrating the motorcycle 1 when the measurer measures an output value P3.

FIG. 12 is a view illustrating the motorcycle 1 when the measurer measures the output value P3.

The second coefficient calculation unit 134 calculates the output value coefficient A2. The output value coefficient A2 is a ratio of the output value P3 to the ideal output value P2. The output value P3 is the output value P of the stroke sensor $23rT$ when the stroke amount X of the suspension 23T attached to the motorcycle 1 is the stroke amount X1. In other words, the output value P3 is the output value P of the stroke sensor $23rT$ when the suspension 23T is extended by applying the load G to the suspension 23T attached to the motorcycle 1. In the following description, the motorcycle 1 to which the suspension 23T is attached may be referred to as a motorcycle 1T.

The measurer measures the output value P3.

An example of a method in which the measurer measures the output value P3 will be described. The measurer hangs a suspension member H capable of suspending the motorcycle 1T on the vehicle body 10 of the motorcycle 1T and suspends the vehicle body 10 of the motorcycle 1T by causing the suspension member H to lift the vehicle body 10. For example, a belt is used as the suspension member H. When the motorcycle 1T is suspended by the suspension member H and rises from a ground gr, the vehicle body 10 is supported by the suspension member H, while the wheel 4 is not supported by the suspension member H. In this case, by being connected to the wheel 4 side of the suspension 23T, an "unsprung load", which is a sum of loads of respective members (for example, the wheel 4 and the like) constituting a part of one motorcycle 1T, acts on the suspension 23T. Here, assuming that an unsprung load is Gw and an angle formed by a direction in which the suspension 23T is extended and a direction in which gravity is applied is an angle α, the load G applied to the suspension 23T can be calculated by the following equation (2).

$$G = Gw \times \cos\alpha \quad (2)$$

The measurer sets an output value of the stroke sensor $23rT$ of the motorcycle 1T when the wheel 4 is suspended by the suspension member H and rises from the ground gr as the output value P3. The output value P3 thus obtained is stored in the storage unit 120 of the control device 100.

The second coefficient calculation unit 134 calculates the output value coefficient A2 based on the ideal output value P2 and the output value P3. More specifically, a ratio of the output value P3 to the ideal output value P2 is calculated as the output value coefficient A2 (A2=P3/P2).

The second coefficient calculation unit 134 stores the calculated output value coefficient A2 in the storage unit 120 of the control device 100.

(Calibration Value Calculation Unit 135)

The calibration value calculation unit 135 calculates the calibration value P4. The calibration value P4 is a calibrated value of the output value P of the stroke sensor $23rT$. More specifically, the calibration value P4 is a calibrated value of the output value P of the stroke sensor $23rT$ when the suspension 23T attached to the motorcycle 1T is most contracted.

The calibration value calculation unit 135 calculates the calibration value P4 based on the output value P0, the stroke amount X1, the stroke-possible amount X0, the output value coefficient A2, and the output value P3. More specifically, the calibration value calculation unit 135 calculates the calibration value P4 by the following equation (3).

$$P4 = P3 - (X1/X0) \times (P0 \times A2) \quad (3)$$

The calibration value calculation unit 135 stores the calculated calibration value P4 in the storage unit 120 of the control device 100.

(Expression Calculation Unit 136)

The expression calculation unit 136 calculates a relational expression between the output value P of the stroke sensor $23rT$ and the stroke amount X of the suspension 23T attached to the motorcycle 1T based on the output value P3 and the calibration value P4.

Figure 13:
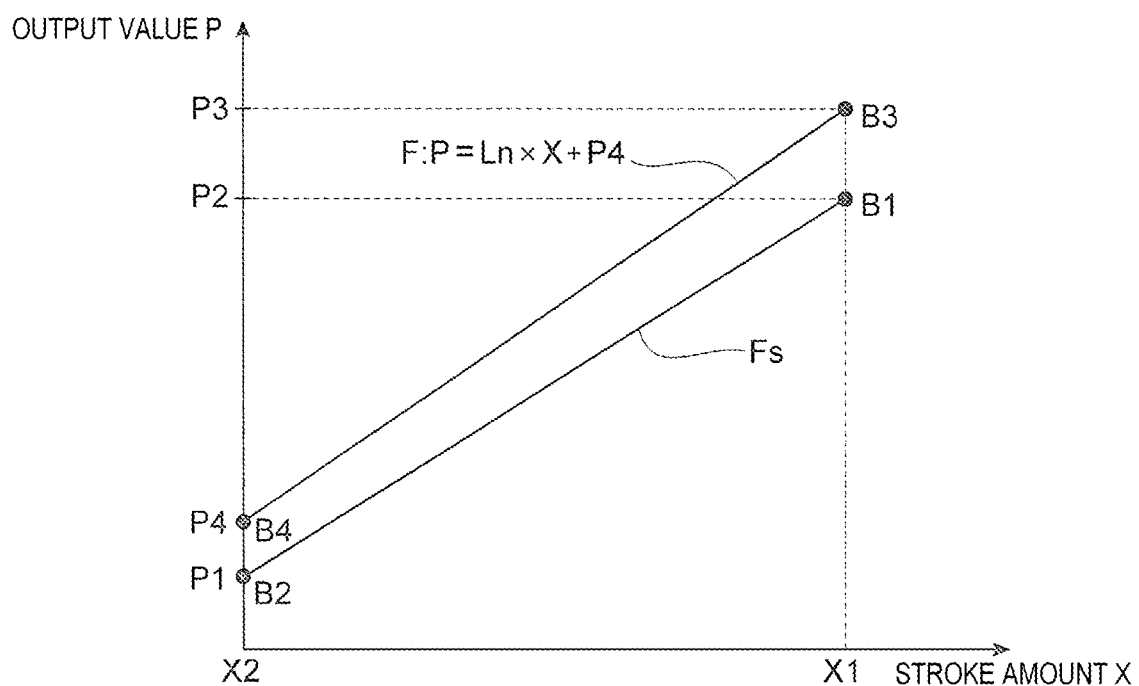
FIG. 13 is a diagram illustrating a relationship between a stroke amount X of the suspension 23 and an output value P of the stroke sensor 23r.

FIG. 13 is a diagram illustrating a relationship between the stroke amount X of the suspension 23 and the output value P of the stroke sensor $23r$. In FIG. 13, a horizontal axis represents the stroke amount X of the suspension 23, and a vertical axis represents the output value P of the stroke sensor $23r$. In FIG. 13, a point B1 is a point where a value of the horizontal axis is the stroke amount X1 and a value of the vertical axis is the ideal output value P2. In FIG. 13, a point B2 is a point where a value of the horizontal axis is the stroke amount X2 and a value of the vertical axis is the shortest output value P1. In FIG. 13, a point B3 is a point where a value of the horizontal axis is the stroke amount X1 and a value of the vertical axis is the output value P3. In FIG. 13, a point B4 is a point where a value of the horizontal axis is the stroke amount X2 and a value of the vertical axis is the calibration value P4.

The expression calculation unit 136 sets a relationship between coordinates on a straight line passing through the point B4 and the point B3 as a relationship between the stroke amount X of the suspension 23T attached to the motorcycle 1T and the output value P of the stroke sensor $23rT$. In other words, the expression calculation unit 136 derives the relational expression F including the straight line passing through the point B4 and the point B3 as an expression indicating the relationship between the stroke amount X of the suspension 23T attached to the motorcycle 1T and the output value P of the stroke sensor $23rT$. The relational expression F can be defined by the following equation (4).

Relational expression $F$: $P = Ln \times X + P4$ (4)

Ln is a slope of a solid line represented by the relational expression F. The slope Ln can be defined by the following equation (5).

$$Ln = (P3 - P4)/(X1 - X2) \quad (5)$$

The expression calculation unit 136 stores the calculated relational expression F in the storage unit 120 of the control device 100.

When the calculation unit 140 receives the output value P of the stroke sensor 23r from the derivation unit 110, the calculation unit 140 calculates the stroke amount X of the suspension 23 by substituting the received output value P into the relational expression F stored in the storage unit 120. The calculation unit 140 transmits the calculated stroke amount X to the control unit 150.

The control unit 150 controls an initial load of the spring 23s of the suspension 23 by driving the motor 96 by a driving force and a rotation direction of the motor 96 according to the stroke amount X received from the calculation unit 140.

(Effects)

The expression calculation unit 136 sets the relationship between the output value P of the stroke sensor 23rT and the stroke amount X of the suspension 23T using the output value P3 obtained by measurement of the suspension 23T attached to the motorcycle 1T.

Here, for example, a method may be considered in which the measurer sets the relationship between the output value P and the stroke amount X without measuring the output value P of the suspension 23 attached to the motorcycle 1. As an example, there is a method for uniformly setting a relational expression Fs including a line passing through the point B2 and the point B1 in FIG. 13 as the relationship between the output value P and the stroke amount X for all the suspensions 23. However, the output value P of the stroke sensor 23r when the suspension 23 has the specific stroke amount X may be different for each suspension 23 due to a dimensional accuracy, a dimensional tolerance, or the like of a component. When the suspension 23 has the specific stroke amount X, the output value P specified by the control device 100 may be different for each control device 100.

Therefore, the setting unit 130 sets the relationship between the output value P of the stroke sensor 23rT and the stroke amount X of the suspension 23T using the output value P3 obtained by measurement of the motorcycle 1T in which the suspension 23 and the control device 100 are defined.

In the present embodiment, the second coefficient calculation unit 134 calculates the output value coefficient A2 using the ideal output value P2 and the output value P3. Further, the calibration value calculation unit 135 calculates the calibration value P4 by using the output value P0, the stroke amount X1, the stroke-possible amount X0, the output value coefficient A2, and the output value P3. In other words, the calibration value calculation unit 135 calculates the calibration value P4 based on a fact that the relationship between the output value P of the stroke sensor 23rT and the stroke amount X of the suspension 23T is determined according to the output value coefficient A2.

More specifically, the calibration value calculation unit 135 calculates the calibration value P4 in consideration of a fact that a width of the output value P which can be calculated by the relational expression F is determined according to the output value coefficient A2. More specifically, when the output value coefficient A2 is larger than 1, the calibration value calculation unit 135 calculates the calibration value P4 in consideration of a fact that a width of the output value P which can be calculated by the relational expression F is larger than a width of the output value P which can be calculated by the relational expression Fs. When the output value coefficient A2 is smaller than 1, the calibration value calculation unit 135 calculates the calibration value P4 in consideration of a fact that a width of the output value P which can be calculated by the relational expression F is smaller than a width of the output value P which can be calculated by the relational expression Fs. The width of the output value P which can be calculated is a width of a magnitude from the output value P of the stroke sensor 23rT when the suspension 23T is most contracted to the output value P of the stroke sensor 23rT when the suspension 23T is most extended.

The calibration value calculation unit 135 calculates the calibration value P4 in this manner, so that an accuracy of the output value P of the stroke sensor 23r corresponding to the stroke amount X of the suspension 23 can be improved.

The calibration value calculation unit 135 calculates the calibration value P4 using the output value P3 which is one output value P measured for the suspension 23T attached to motorcycle 1T. In other words, for the suspension 23T attached to the motorcycle 1T, the calibration value P4 is calculated without measuring the output values P when the plurality of stroke amounts X are different from each other.

In the present embodiment, the first coefficient calculation unit 131 calculates the output value coefficient A1 using the inductances L of the plurality of stroke sensors 23r, the capacitances C of the plurality of control devices 100, and the least squares method.

In this case, as compared with a case where the output value coefficient A1 is calculated by using only one stroke sensor 23r and one control device 100, it is possible to suppress variation in the output value coefficient A1 due to the stroke sensor 23r and the control device 100 used to calculate the output value coefficient A1.

In the first embodiment, the shortest output value P1 is an average value of the minimum output values Pm1 measured for the plurality of suspensions 23.

In this case, variation in the shortest output value P1 due to the suspension 23 used to calculate the shortest output value P1 is suppressed.

(Calibration Method)

Next, a method for calculating the calibration value P4 will be described. In the following description, the method for calculating the calibration value P4 may be referred to as a calibration method.

Figure 14:
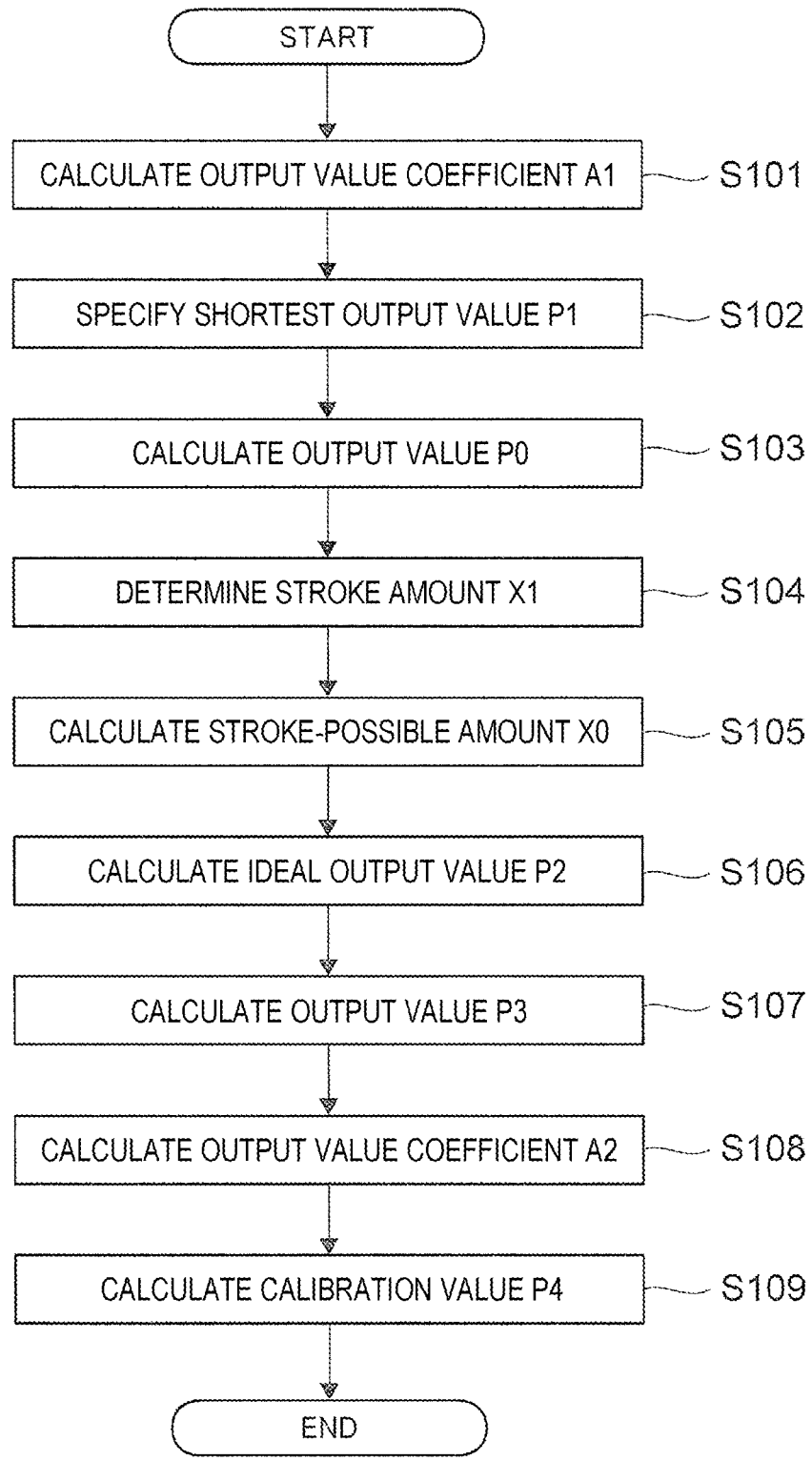
FIG. 14 is a flowchart illustrating an example of a calibration method.

FIG. 14 is a flowchart illustrating an example of the calibration method.

The measurer measures the minimum output value Pm1 and the maximum output value Px1. The measurer calculates the subtraction value D1 based on the minimum output value Pm1 and the maximum output value Px1. The first coefficient calculation unit 131 calculates the output value coefficient A1 using the minimum output value Pm1 and the subtraction value D1 (step (hereinafter, may be referred to as "S") 101).

The measurer measures the minimum output values Pm1 for the plurality of suspensions 23. In addition, the measurer specifies an average value of the obtained minimum output values Pm1 as the shortest output value P1 (S102).

The output value calculation unit 132 obtains the output value P0 by multiplying the shortest output value P1 by the output value coefficient A1 (S103).

The measurer determines the stroke amount X1 (S104).

The measurer measures the stroke amount X2 and the stroke amount X3 of the motorcycle 1T. The measurer calculates the stroke-possible amount X0 using the measured stroke amount X2 and stroke amount X3 (S105).

The ideal value calculation unit 133 calculates the ideal output value P2 using the stroke amount X1, the stroke-possible amount X0, the shortest output value P1, and the output value P0 (S106).

The measurer calculates the output value P3 (S107).

The second coefficient calculation unit 134 calculates the output value coefficient A2 by dividing the output value P3 by the ideal output value P2 (S108).

The calibration value calculation unit 135 calculates the calibration value P4 using the output value P3, the stroke amount X1, the stroke-possible amount X0, the output value P0, and the output value coefficient A2 (S109).

In addition, the expression calculation unit 136 calculates the relational expression F using the output value P3 and the calibration value P4.

An order of the steps in the calibration method is not limited to the above example.

For example, step 101 may be performed after step 102. In addition, step 104 may be performed after step 105. Further, step 101, step 102, and step 103 may be performed after step 104 and step 105.

Second Embodiment

In a second embodiment, a method for calculating the shortest output value P1 is different from that in the first embodiment. In the first embodiment, it has been described that an average value of the minimum output values Pm1 measured for the plurality of suspensions 23 is used as the shortest output value P1. In contrast, in the second embodiment, a median value of the minimum output values Pm1 measured for the plurality of suspensions 23 is used as the shortest output value P1. The median value is the minimum output value Pm1 corresponding to a middle in an order when the minimum output values Pm1 measured for the suspensions 23 are arranged in an ascending order. In a case where there are an even number of minimum output values Pm1 obtained by measurement of the plurality of suspensions 23, an average value of two minimum output values Pm1 closest to a middle in an order when the even number of minimum output values Pm1 are arranged in an ascending order is set as a median value. The measurer inputs the median value to the storage unit 120 as the shortest output value P1.

In this case, even when an excessively large minimum output value Pm1 or an excessively small minimum output value Pm1 is included in the minimum output values Pm1 obtained by the measurement of the plurality of suspensions 23, it is possible to suppress a change in the shortest output value P1 due to presence of the excessively large minimum output value Pm1 or the excessively small minimum output value Pm1.

Third Embodiment

In a third embodiment, the number of suspensions 23 to be measured in order to obtain the shortest output value P1 is different from that in the first embodiment. In the first embodiment, the measurer measures the minimum output value Pm1 for any number of five to ten suspensions 23. In contrast, in the third embodiment, the measurer extracts a predetermined ratio of suspensions 23 from all the suspensions 23 for which a relationship between the output value P and the stroke amount X is to be set, and measures the minimum output value Pm1 for each of the extracted suspensions 23. The predetermined ratio may be any ratio, and is, for example, 0.1. The measurer calculates the shortest output value P1 using the minimum output value Pm1 obtained by measurement for each extracted suspension 23.

Although the embodiments of the present invention have been described above, the technical scope of the present invention is not limited to the scope described in the above embodiments. It is apparent from the description of the claims that various modifications or improvements for the embodiments described above are also included in the technical scope of the present invention.

The expression calculation unit 136 calculates the relational expression F as setting of the relationship between the output value P of the stroke sensor 23rT and the stroke amount X of the suspension 23T, but the present invention is not limited thereto.

The expression calculation unit 136 may associate at least one output value P of the stroke sensor 23rT with one stroke amount X of the suspension 23T. That is, the expression calculation unit 136 may not set the relationship between the output value P of the stroke sensor 23rT and the stroke amount X of the suspension 23T for each stroke amount X which can be taken by the suspension 23T.

A configuration used for suspending the vehicle body 10 is not limited to the suspension member H (see FIG. 12).

For example, the measurer places the vehicle main body 10 on a support means (not illustrated) which supports the vehicle main body 10 to rise the wheels 4 from the ground gr, and the vehicle main body 10 is supported by the support means while the wheels 4 are not supported, so that the vehicle body 10 may be suspended.

The setting unit 130 sets the relationship between the stroke amount X of the suspension 23 attached to the motorcycle 1 and the output value P of the stroke sensor 23r, but the suspension 23 to be set is not limited to the suspension 23 attached to the motorcycle 1.

For example, the setting unit 130 may set the relationship between the stroke amount X of the suspension 23 attached to a motor tricycle or the like including two front wheels and one rear wheel, or one front wheel and two rear wheels, and the output value P of the stroke sensor 23r. That is, the suspension 23T for which the setting unit 130 sets the relationship between the stroke amount X and the output value P may be attached to a saddle-type vehicle.

The invention claimed is:

1. A calibration device comprising:
a first coefficient calculation unit configured to calculate a first coefficient representing a relationship between a difference between a maximum output value and a minimum output value, and the minimum output value, according to a predetermined condition by using an inductance of a detector which detects an extension/contraction amount of a suspension device and a capacitance of a capacitor provided in a control device to which an output value of the detector is input, the maximum output value being an output value of the detector when the suspension device has a maximum extension/contraction amount, the minimum output value being an output value of the detector when the suspension device has a minimum extension/contraction amount;
a first output unit configured to obtain a first output value by multiplying the first coefficient by a shortest output value specified to satisfy a predetermined condition by using the output value of the detector when the suspension device has the minimum extension/contraction amount;
an ideal value calculation unit configured to calculate an ideal value of the output value of the detector when the extension/contraction amount of the suspension device is a first extension/contraction amount by using the first extension/contraction amount, an operation amount which is a difference between the maximum extension/contraction amount and the minimum extension/contraction amount of the suspension device, the shortest output value, and the first output value, the first extension/contraction amount being an extension/contraction amount of the suspension device in a state where a wheel connected to the suspension device is not grounded;
a second coefficient calculation unit configured to calculate a second coefficient by dividing a second output value by the ideal value, the second output value being an actual output value of the detector when the extension/contraction amount of the suspension device is the first extension/contraction amount; and
a calibration unit configured to calculate a calibration value which is an output value after calibration of the detector when the suspension device has the minimum extension/contraction amount, by using the second output value, the first extension/contraction amount, the operation amount, the first output value, and the second coefficient.

2. The calibration device according to claim 1, wherein the first coefficient calculation unit calculates the first coefficient using a plurality of inductances, a plurality of capacitances, and a least squares method.

3. The calibration device according to claim 1, wherein the first output unit specifies an average value of output values of the detectors as the shortest output value when each of a plurality of the suspension devices has a minimum extension/contraction amount.

4. A suspension system comprising:
the calibration device according to claim 1;
a detector whose output value is calibrated by the calibration device;
a suspension device whose extension/contraction amount is detected by the detector; and
a control device which controls an initial load of the suspension device according to the detected extension/contraction amount.

5. A saddle-type vehicle comprising:
a vehicle body;
a wheel; and
the suspension system according to claim 4 provided between the vehicle body and the wheel.

6. A calibration method comprising:
a first coefficient calculation step of calculating a first coefficient representing a relationship between a difference between a maximum output value and a minimum output value, and the minimum output value, according to a predetermined condition by using an inductance of a detector which detects an extension/contraction amount of a suspension device and a capacitance of a capacitor provided in a control device to which an output value of the detector is input, the maximum output value being an output value of the detector when the suspension device has a maximum extension/contraction amount, the minimum output value being an output value of the detector when the suspension device has a minimum extension/contraction amount;
a first output step of obtaining a first output value by multiplying the first coefficient by a shortest output value specified to satisfy a predetermined condition by using the output value of the detector when the suspension device has the minimum extension/contraction amount;
an ideal value calculation step of calculating an ideal value of the output value of the detector when the extension/contraction amount of the suspension device is a first extension/contraction amount by using the first extension/contraction amount, an operation amount which is a difference between the maximum extension/contraction amount and the minimum extension/contraction amount of the suspension device, the shortest output value, and the first output value, the first extension/contraction amount being an extension/contraction amount of the suspension device in a state where a wheel connected to the suspension device is not grounded;
a second coefficient calculation step of calculating a second coefficient by dividing a second output value by the ideal value, the second output value being an actual output value of the detector when the extension/contraction amount of the suspension device is the first extension/contraction amount; and
a calibration step of calculating a calibration value which is an output value after calibration of the detector when the suspension device has the minimum extension/contraction amount, by using the second output value, the first extension/contraction amount, the operation amount, the first output value, and the second coefficient.

7. The calibration device according to claim 2, wherein the first output unit specifies an average value of output values of the detectors as the shortest output value when each of a plurality of the suspension devices has a minimum extension/contraction amount.

8. A suspension system comprising:
the calibration device according to claim 2;
a detector whose output value is calibrated by the calibration device;
a suspension device whose extension/contraction amount is detected by the detector; and
a control device which controls an initial load of the suspension device according to the detected extension/contraction amount.

9. A suspension system comprising:
the calibration device according to claim 3;
a detector whose output value is calibrated by the calibration device;
a suspension device whose extension/contraction amount is detected by the detector; and
a control device which controls an initial load of the suspension device according to the detected extension/contraction amount.

10. A suspension system comprising:
the calibration device according to claim 7;
a detector whose output value is calibrated by the calibration device;
a suspension device whose extension/contraction amount is detected by the detector; and
a control device which controls an initial load of the suspension device according to the detected extension/contraction amount.

11. A saddle-type vehicle comprising:
a vehicle body;
a wheel; and
the suspension system according to claim 8 provided between the vehicle body and the wheel.

12. A saddle-type vehicle comprising:
a vehicle body;
a wheel; and
the suspension system according to claim 9 provided between the vehicle body and the wheel.

13. A saddle-type vehicle comprising:
a vehicle body;
a wheel; and
the suspension system according to claim 10 provided between the vehicle body and the wheel.

* * * * *